Patented Apr. 25, 1933

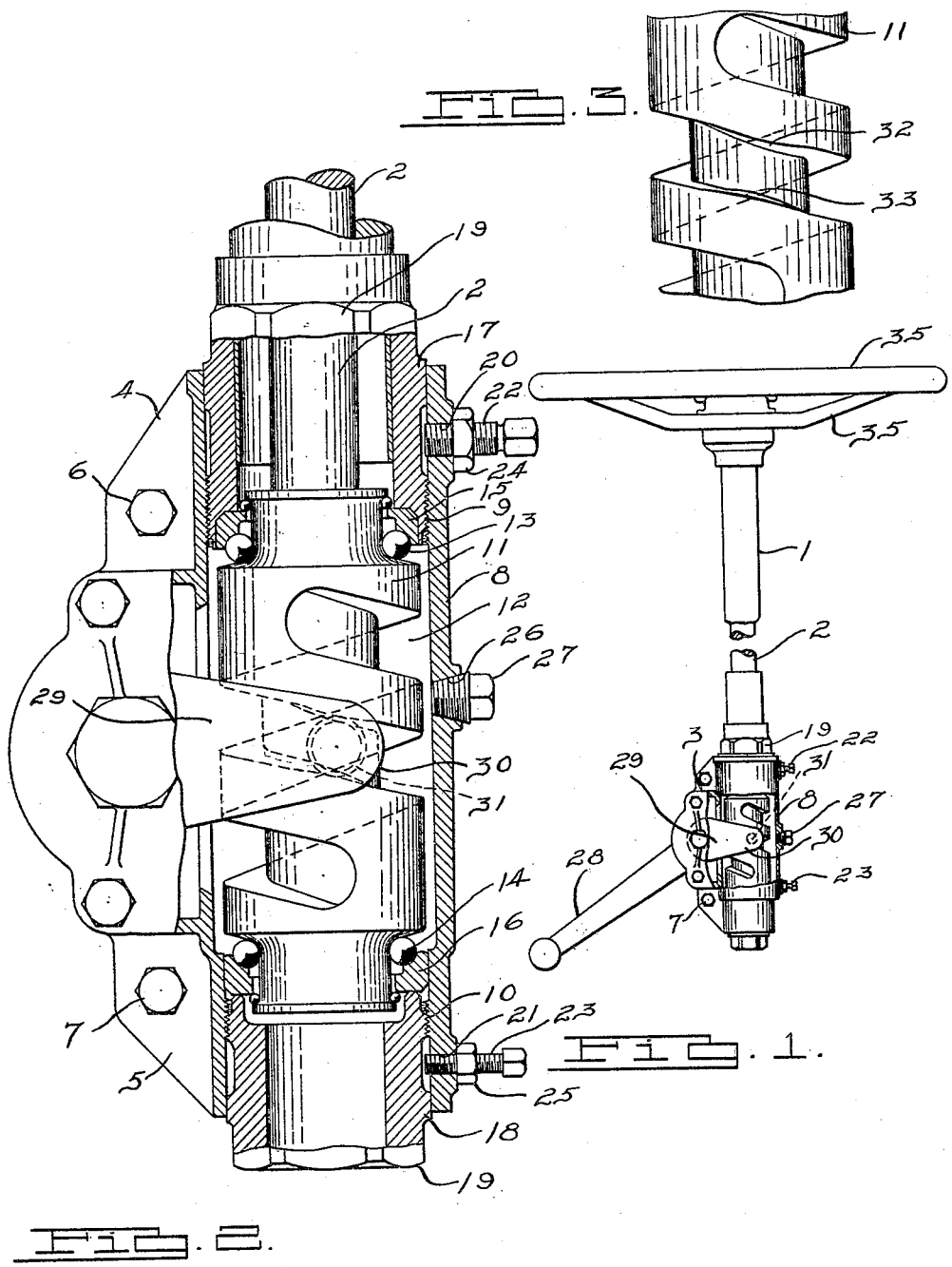

1,905,484

UNITED STATES PATENT OFFICE

CHARLES D. McCALL, OF DETROIT, MICHIGAN, ASSIGNOR TO CHRYSLER CORPORATION, OF DETROIT, MICHIGAN, A CORPORATION OF DELAWARE

STEERING GEAR MECHANISM

Application filed April 2, 1930. Serial No. 441,122.

This invention relates to improved steering mechanism, particularly for motor vehicles.

Heretofore, in steering gears which have driving mechanism of the worm cam and lever type, attempts have been made to reduce the backlash or loose play to a minimum at the straightforward driving position of the mechanism by forming a slight constriction in the portion of the worm groove in which a cam pin is located during straightforward driving. Numerous difficulties are encountered with this construction because of the variations in length of tie rods, pitman arms and other connecting members of the steering apparatus and frequently the steering columns of various models of vehicles, such as coupes, sedans, roadsters and touring cars are mounted at different inclinations causing the relative positions of the cams and cam pins to vary at straightforward driving positions. As a result, steering apparatus of this kind of identical construction cannot be installed in different models of a vehicle or even in a single model without displacing the cam pin from the restricted portion of the groove at the straightforward driving position of the mechanism.

The main objects of this invention are to provide a shiftable driving member on the steering column of steering apparatus of this kind; to provide a driven member which has a closer fitting engagement with the driving member during a predetermined portion of the operating stage thereof than during the remaining portion of the operating stage; to provide a cam driving member of this kind which has a cam groove that is restricted at its interemdiate portion for producing a close fitting engagement between the driving and driven members; and to provide means for shifting the driving cam axially of the steering column and relative to the driven member so as to cause the cam pin of the driven member to be seated on the constricted part of the cam groove when the driving mechanism is set in a straightforward driving position.

An illustrative embodiment of this invention is shown in the accompanying drawing, in which:

Fig. 1 is a side elevation, partly in section, of a steering wheel, column and knuckle.

Fig. 2 is an enlarged vertical section of a steering knuckle embodying my invention.

Fig. 3 is a fragmentary detail of the cam shown in Figs. 1 and 2.

In the form shown, the steering gear includes a steering column 1 having a steering main tube 2 which extends into a steering knuckle housing 3 that is provided with flanges 4 and 5 by means of which the housing may be rigidly mounted on the chassis frame of a vehicle by bolts 6 and 7. The steering knuckle housing 3 has a tubular portion 8, concentric with the steering column which is threaded internally adjacent its respectively opposite ends at 9 and 10. Shiftably mounted on the steering main tube 2 is a cam driving member 11 having a worm shaped cam groove 12.

The driving member or cam 11 is secured against rotation relative to the steering main tube 2 by splines, not shown, and it is held against axial movement relative to the tube 2 by end thrust bearings 13 and 14 which are located in grooves of annular bearing seats 15 and 16 respectively. Adjustable collars 17 and 18 extend into the respectively opposite ends of the tubular part 8 of the steering knuckle and bear against the bearing seats 15 and 16 respectively as shown in Fig. 2. These collars have hexagonal nut portions 19 on their outer extremities and they are threaded on the threads 9 and 10 of the tubular part 8.

Formed in the wall of the tubular part 8 are apertures 20 and 21 which register respectively with the adjustable collars 17 and 18, in which set bolts 22 and 23 are threaded having lock nuts 24 and 25 by which the bolts may be secured against displacement. The inner extremities of the bolts 22 and 23 engage the adjustable collars 17 and 18 and releasably hold the latter in an adjusted position. A grease inlet 26 is formed in the tubular part 8 and is normally closed by a plug 27.

A driven member or crank which includes a pitman arm 28, a shaft 29 and a lever 30 is journaled in the steering knuckle housing 3 in close proximity to the cam 11. Formed on the free end of the lever 30 is a cam pin 31 which extends into the worm shaped groove 12 of the cam member 11 so as to oscillate the pitman arm 28 as the cam 11 is rotated first in one direction and then in another.

In the relative positions of the driving and driven members shown in Fig. 1, the pitman arm 28 is located so as to retain the wheels of a vehicle in a straightforward driving position. The portion of the worm groove 12 in which the cam pin 31 is located when the pitman arm 28 is in its straightforward driving position has a slight constriction which is formed by inwardly projecting protuberances 32 and 33 on the respectively opposite walls of the groove. Throughout the remainder of the groove 12, the pin 31 has limited freedom of movement laterally of the groove but in the constricted part of the groove, between the protuberances, the loose play or backlash between the driving and driven members is reduced to a minimum.

In assembling steering gears of this kind in vehicles the variations in the lengths of drag links and other connecting parts of the steering mechanism and the diverse inclinations in which the steering columns are located in various models prevents an accurate predetermination of the location of the pitman arm 28 for straightforward driving conditions. For this reason, it is necessary to adjust the driving cam member 11 relative to the cam pin 31 of the driven member so as to make certain that the pin 31 is located between the protuberances 32 and 33 when the wheels of the vehicle are straight. This adjustment may be made by shifting the cam 11 axially of the steering main tube 2. In making the adjustment, the set bolts 22 and 23 are released and one of the adjustable collars 17 and 18 is screwed outwardly while the other is screwed inwardly depending upon the direction of movement of the cam 11 desired. In this manner, the driving and driven members may be placed in a relation with respect to each other which causes the cam pin 31 to be located in the constricted portion of the groove 12 when the pitman arm 28 is located so as to retain the wheels of a vehicle in a straightforward direction.

The steering gear may also be adjusted in the above manner for the purpose of placing the spokes 34 of the steering wheel 35 in a predetermined position relative to the pitman arm so as to obviate concealing of instruments on the instrument board of a vehicle by the spokes when the vehicle is driven straightforwardly.

Although but one specific embodiment of this invention has herein been shown and described, it will be understood that various changes including the size, shape and arrangement of parts may be made without departing from the spirit of my invention and it is not my intention to limit its scope other than by the terms of the appended claims.

I claim:

1. In steering apparatus, driving and driven members having a substantially closer fitting engagement with each other throughout a limited portion of their operating cycle than during the remainder of said operating cycle, and means for shifting one of said members in respectively opposite directions relative to the other member for locating the latter member in a selected position when said members are in close fitting engagement.

2. In steering apparatus, a support, a steering column extending into said support, a driven member journaled on said support, and a driving member shiftably mounted on said steering column coacting with said driven member and having a substantially close fitting engagement with said driven member throughout only a limited portion of the operating cycle of said members, said driving member being adjustable for locating said driven member in a selected position when said members are in close fitting engagement with each other.

3. In steering apparatus for vehicles, a support, a steering column extending into said support, a driven member journaled on said support, a driving member shiftably mounted on said steering column having a closer fitting engagement with said driven member throughout a limited stage of its operating cycle than during the remainder of said cycle, and means for shifting said driving member relative to said driven member so as to cause the close fitting stage of said operating cycle to occur when the wheels of said vehicle are in a straightforward driving position.

4. In steering apparatus for vehicles, a support, a steering column extending into said support, a driving member having a cam groove therein shiftably mounted on said steering column, said groove being restricted at its intermediate portion, a driven member journaled on said support having a cam pin extending into said groove, a pitman arm on said driven member for controlling the wheels of said vehicle, and means for shifting said driving member relative to driven member so as to position said pin in the restricted portion of said groove when the wheels are held in a straightforward driving position by said pitman arm.

5. In steering apparatus for vehicles, a steering knuckle housing having a tubular part, a steering tube extending into said tubular part, a cam member shiftably mounted on said tube having a groove therein, thrust bearings at the respectively opposite ends of said cam, a driven member journaled on said housing having a pitman arm for controlling the wheels of said vehicle, a pin on said driven member extending into said groove, protuberances on respectively opposite limited portions of the walls of said groove, and a pair of collars, one threaded in each end of said tubular part and engaging said bearings for shifting said cam to locate said pitman arm in a selected position when said pin is seated in the restricted portion of said groove.

CHARLES D. McCALL.